United States Patent
Haag et al.

(10) Patent No.: US 12,351,024 B2
(45) Date of Patent: Jul. 8, 2025

(54) DISPLAY SYSTEM FOR VEHICLE

(71) Applicant: 3M INNOVATIVE PROPERTIES COMPANY, St. Paul, MN (US)

(72) Inventors: Adam D. Haag, Woodbury, MN (US); Stephan J. Pankratz, Eagan, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 242 days.

(21) Appl. No.: 17/923,281

(22) PCT Filed: Apr. 7, 2021

(86) PCT No.: PCT/IB2021/052899
§ 371 (c)(1),
(2) Date: Nov. 4, 2022

(87) PCT Pub. No.: WO2021/224697
PCT Pub. Date: Nov. 11, 2021

(65) Prior Publication Data
US 2023/0256820 A1 Aug. 17, 2023

Related U.S. Application Data

(60) Provisional application No. 62/704,396, filed on May 8, 2020.

(51) Int. Cl.
*B60K 35/00* (2024.01)
*B60K 35/23* (2024.01)
*G02B 27/01* (2006.01)

(52) U.S. Cl.
CPC .......... *B60K 35/00* (2013.01); *G02B 27/0101* (2013.01); *B60K 35/23* (2024.01); *B60K 2360/23* (2024.01); *B60K 2360/332* (2024.01)

(58) Field of Classification Search
CPC .... B60K 35/00; B60K 35/23; B60K 2360/23; B60K 2360/332; B60K 2360/334; G02B 27/0101
See application file for complete search history.

(56) References Cited

U.S. PATENT DOCUMENTS 10,393,935 B2   8/2019   Finger
2004/0135742 A1*  7/2004  Weber ............... B32B 17/10036
                                                    345/7

(Continued)

FOREIGN PATENT DOCUMENTS

EP         3432050 A1      1/2019
JP       2016133700 A      7/2016

(Continued)

OTHER PUBLICATIONS

International Search Report for PCT Application No. PCT/IB2021/052899, mailed on May 25, 2021, 3 pages.

*Primary Examiner* — Richard A Hansell, Jr.
(74) *Attorney, Agent, or Firm* — Clifton F. Richardson; Robert S. Moshrefzadeh

(57) ABSTRACT

A display system includes a display panel configured to emit polarized light having a first polarization state and substantially distinct blue, green and red emission spectra having respective blue, green and red full widths at half maxima (FWHMs). The display system includes a reflective polarizer configured to reflect the polarized image light as a first reflected polarized image light. For substantially normally incident light and for the first polarization state, the reflective polarizer has a reflectance of greater than about 60% across each of the blue and red FWHMs, and a transmittance of at least about 50% for at least a first wavelength between the FWHMs of the blue and green emission spectra, and for (Continued)

at least a second wavelength between the FWHMs of the green and red emission spectra.

10 Claims, 8 Drawing Sheets

(56) References Cited

U.S. PATENT DOCUMENTS

| | | |
|---|---|---|
| 2017/0052369 A1 | 2/2017 | Shimatani et al. |
| 2017/0269361 A1* | 9/2017 | Xu .................... G02B 27/0101 |
| 2020/0055400 A1 | 2/2020 | Edmonds et al. |
| 2020/0189363 A1* | 6/2020 | Sugiyama ............ G02B 5/3025 |

FOREIGN PATENT DOCUMENTS

| | | | |
|---|---|---|---|
| WO | 2018047522 A1 | 3/2018 | |
| WO | WO-2018163009 A1 * | 9/2018 | ........... G02B 27/283 |
| WO | WO-2018165126 A1 * | 9/2018 | ............. B60K 35/00 |
| WO | 2020051874 A1 | 3/2020 | |

\* cited by examiner

DISPLAY SYSTEM FOR VEHICLE

CROSS REFERENCE TO RELATED APPLICATIONS

This application is a national stage filing under 35 U.S.C. 371 of PCT/IB2021/052899, filed Apr. 7, 2021, which claims the benefit of U.S. Provisional Application No. 62/704,396, filed May 8, 2020, the disclosures of which are incorporated by reference in their entirety herein.

TECHNICAL FIELD

The present disclosure relates generally to a display system used in vehicles, and in particular, to a display system for forming and displaying a virtual image for viewing by a passenger of a vehicle.

BACKGROUND

A heads up display (HUD) is used in a vehicle to present information to a vehicle passenger without requiring the passenger to look away from the vehicle surroundings that can be viewed through a vehicle windshield. HUDs are now increasingly used as a safety feature for vehicles, such as automobiles. A typical HUD includes a display and several mirrors for reflecting and directing emitted light from the display to the passenger.

SUMMARY

In a first aspect, the present disclosure provides a display system for displaying a virtual image to a passenger of a vehicle. The display system includes a display panel, a reflective polarizer and a mirror.

The display panel is configured to emit a polarized image light having a first polarization state and substantially distinct blue, green and red emission spectra having respective blue, green and red full widths at half maxima (FWHMs). The reflective polarizer is configured to receive and reflect the polarized image light as a first reflected polarized image light. The reflective polarizer includes a reflection spectrum having substantially distinct blue, green and red reflection bands with respective blue, green and red FWHMs. The mirror is configured to receive and reflect the first reflected polarized image light as a second reflected polarized image light toward a windshield of the vehicle, such that for substantially normally incident light for the first polarization state, the reflective polarizer reflects at least about 60% of the incident light for at least one wavelength within each of the FWHMs of the blue, green and red reflection bands. Further, for the first polarization state, the reflective polarizer transmits at least about 50% of the incident light for at least one same first wavelength between the FWHMs of the blue and green reflection bands and between the FWHMs of the blue and green emission spectra, and for at least one same second wavelength between the FWHMs of the green and red reflection bands and between the FWHMs of the green and red emission spectra. For an orthogonal second polarization state, the reflective polarizer transmits at least about 60% of the incident light for each wavelength in the FWHMs of the blue and red reflection bands and emission spectra and each wavelength therebetween. Further, for at least the first polarization state, the mirror reflects at least about 70% of the incident light for each wavelength in the FWHMs of the blue, green and red emission spectra.

In a second aspect, the present disclosure provides a display system for displaying a virtual image to a passenger of a vehicle. The display system includes a display panel and a reflective polarizer. The display panel is configured to emit polarized light having a first polarization state and substantially distinct blue, green and red emission spectra having respective blue, green and red full widths at half maxima (FWHMs). The reflective polarizer is configured to receive and reflect the polarized image light as a first reflected polarized image light, the first reflected polarized image light configured to be reflected toward the viewer after reflection from at least a windshield of the vehicle, such that for substantially normally incident light, the reflective polarizer has an average total reflectance of greater than about 60% for the first polarization state across each of the blue and red FWHMs, and an average total reflectance of less than about 30% for the first polarization state across the green FWHM. The reflective polarizer further has a transmittance of at least about 50% for the first polarization state for at least a first wavelength between the FWHMs of the blue and green emission spectra, and for at least a second wavelength between the FWHMs of the green and red emission spectra. The reflective polarizer further has an average total transmittance of greater than about 70% across a visible wavelength range including at least each of the blue, green and red FWHMs for an orthogonal second polarization state.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
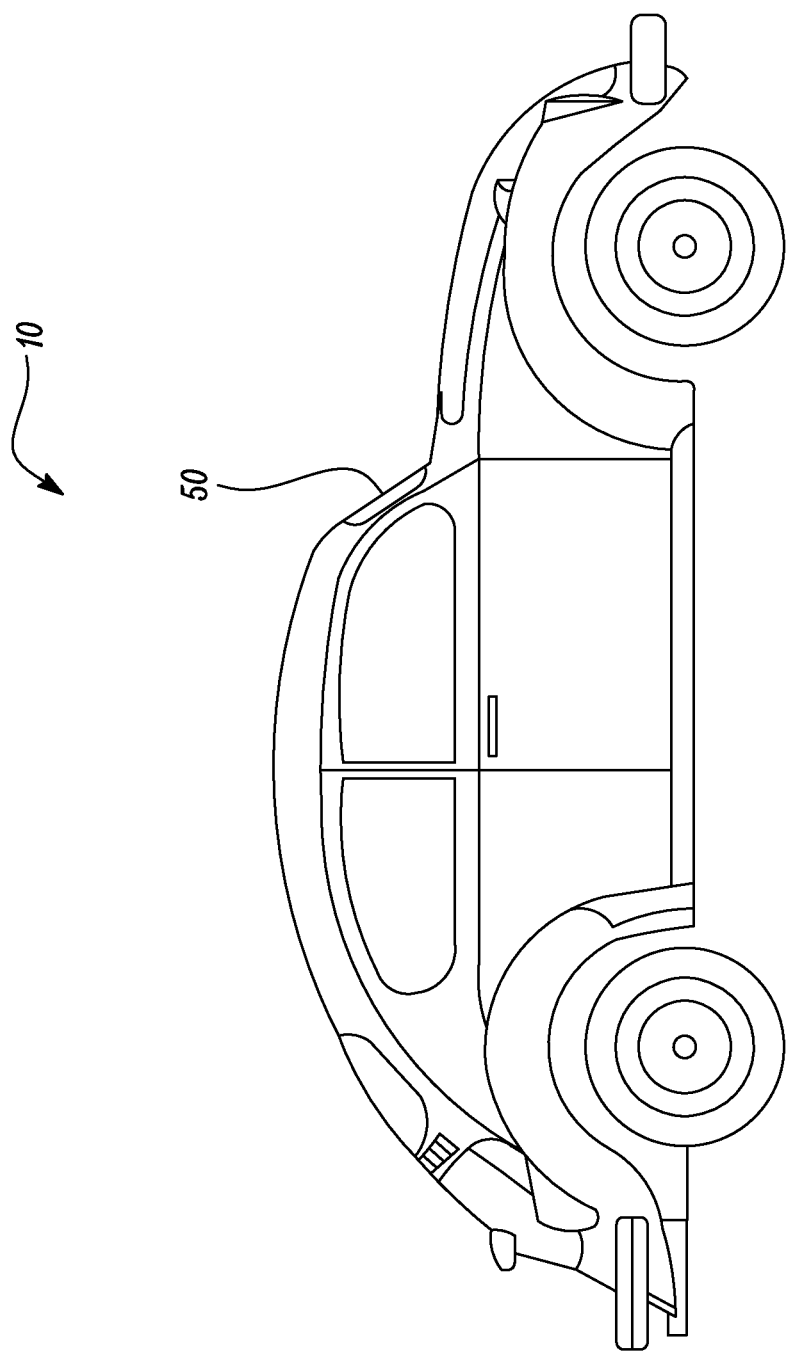
FIG. 1 is a schematic side view of an example of a vehicle having a windshield.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a display system for forming and displaying a virtual image for viewing by a passenger of a vehicle. The display system may be a heads up display (HUD). The display system may be used in various vehicles, such as aircrafts, watercrafts, or landcrafts (including motor vehicles, such as automobiles, trucks, and motorcycles).

The display system includes a display panel and a reflective polarizer. The display system may further include a mirror. The display panel emits a polarized image light having a first polarization state and substantially distinct blue, green and red emission spectra having respective blue, green and red full widths at half maxima (FWHMs). The reflective polarizer receives and reflects the polarized image light as a first reflected polarized image light. The reflective polarizer includes a reflection spectrum having substantially distinct blue, green and red reflection bands with respective blue, green and red FWHMs. The mirror receives and reflects the first reflected polarized image light as a second reflected polarized image toward a windshield of the vehicle, such that for substantially normally incident light, for the first polarization state, the reflective polarizer reflects at least about 60% of the incident light for at least one wavelength within each of the FWHMs of the blue, green and red reflection bands. Further, for the first polarization state, the reflective polarizer transmits at least about 50% of the incident light for at least one same first wavelength between the FWHMs of the blue and green reflection bands and between the FWHMs of the blue and green emission spectra, and for at least one same second wavelength between the FWHMs of the green and red reflection bands and between the FWHMs of the green and red emission spectra. For an orthogonal second polarization state, the reflective polarizer transmits at least about 60% of the incident light for each wavelength in the FWHMs of the blue and red reflection bands and emission spectra and each wavelength therebetween. Further, for at least the first polarization state, the mirror reflects at least about 70% of the incident light for each wavelength in the FWHMs of the blue, green and red emission spectra.

Sunlight incident on the display panels of conventional display systems or HUDs may cause thermal management issues by heating the display panel. In some cases, cold mirrors are used in HUDs to allow a portion of sunlight to pass into a heat sink while reflecting sunlight in visible wavelength range. However, the cold mirrors are generally broadband mirrors. Since a significant amount of solar energy is in visible wavelength range, the cold mirrors still reflect a large amount of solar energy toward the display panel.

The reflective polarizer of the present disclosure may include multiple reflection bands that are selected based on the emission spectra of the display panel, such that the reflective polarizer transmits a significant portion of incident light in the first polarization state for wavelengths outside the emission spectra. The reflective polarizer may also substantially transmit incident light in the second polarization state. Incident light in the first polarization state for wavelengths outside the emission spectra may be from external sources (e.g., sunlight), and is not used for generating the virtual image. Incident light in the second polarization state may also be from external sources. The portion of incident light transmitted by the reflective polarizer may not be received by the display panel. The reflective polarizer may therefore mitigate heating of the display panel due to incident light from external sources.

The reflective polarizer may substantially reflect incident light for the first polarization state and for wavelengths within each of the FWHMs of the blue, green and red reflection bands. The reflective polarizer may substantially transmit incident light for the first polarization state and for wavelengths between the FWHMs of the blue and green reflection bands, and also between the FWHMs of the blue and green emission spectra. The reflective polarizer may further substantially transmit incident light for the first polarization state and for wavelengths between the FWHMs of the green and red reflection bands, and also between the FWHMs of the green and red emission spectra. Thus, the reflective polarizer may improve the thermal management of the display panel.

In addition, the reflective polarizer may substantially transmit incident light for the second polarization state, thereby further improving the thermal management of the display panel.

Referring now to the Figures, FIG. 1 schematically shows a side view of an example vehicle 10 that may implement illustrative embodiments of the present disclosure. The vehicle 10 may include any navigable vehicle that may be operated on a road surface, and includes, without limitation, cars, buses, motorcycles, off-road vehicles, and trucks. In some other embodiments, the vehicle 10 may also include water vehicles and aircrafts. The vehicle 10 includes a windshield 50. The windshield 50 may include any of a wide variety of transparent members, and can be unitary or laminated, flat or curved (simple or compound curvature), water clear or tinted, can have focusing properties (e.g., in the case of goggles or other eyewear), and can be composed of any conventional glasses and/or plastics. In some cases, the windshield 50 may include a sheet of glass or other transparent material with two opposing surfaces.

Figure 2:
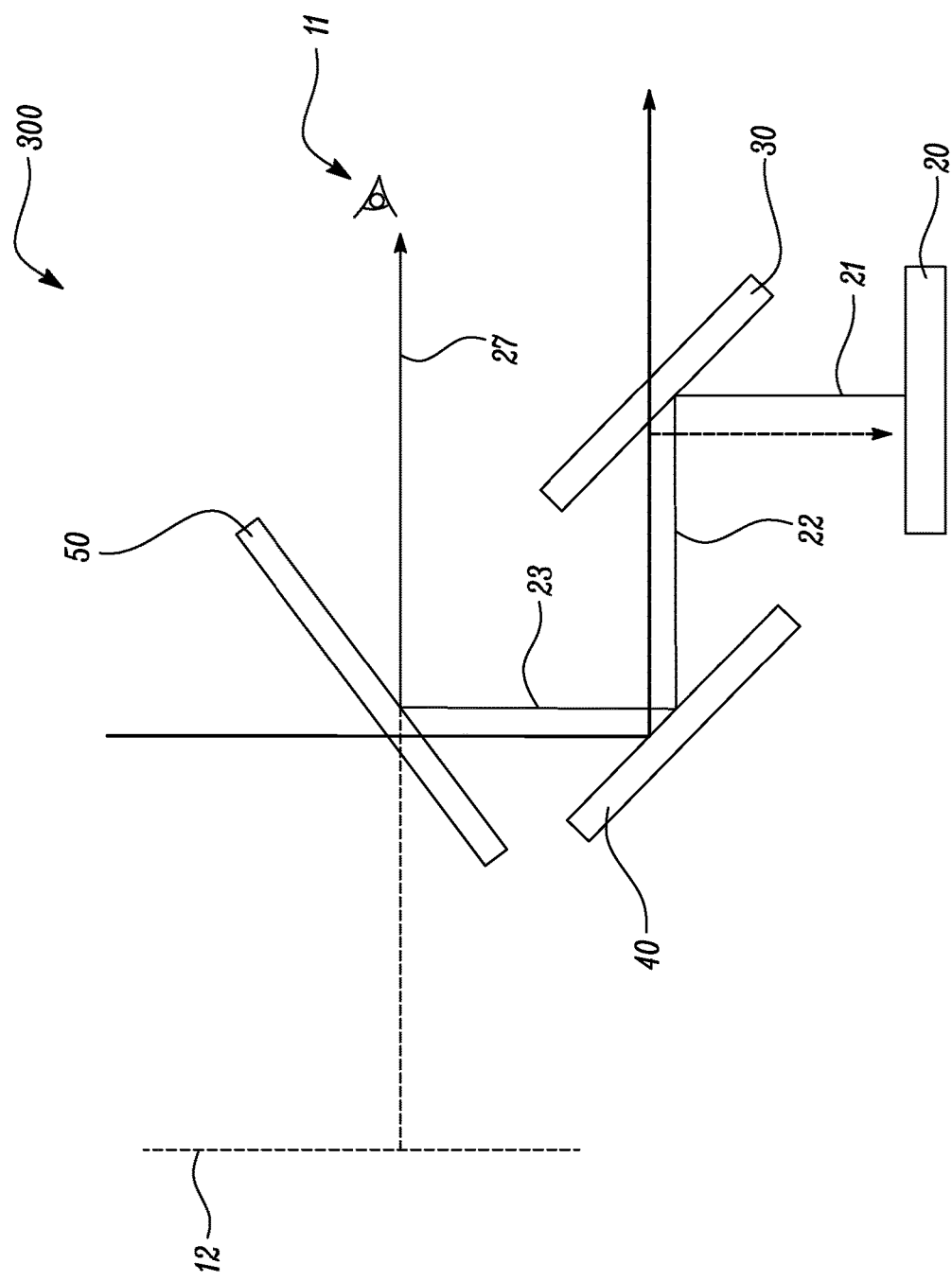
FIG. 2 is a schematic view of a display system according to an embodiment of the present disclosure.

FIG. 2 illustrates a display system 300 for displaying a virtual image 12 to a passenger 11 of the vehicle 10 (shown in FIG. 1). The display system 300 includes a display panel 20 and a reflective polarizer 30. In the illustrated embodiment of FIG. 2, the display system 300 further includes a mirror 40. In some embodiments, the display system 300 is a HUD. The display system 300 displays information to the passenger 11 of the vehicle 10. The passenger 11 may be a driver of the vehicle 10. The display system 300 displays the information in the driver's view, so that the driver may not need to look away from the windshield 50 while driving to see the information displayed. The display system 300 of the vehicle 10 as disclosed in the present disclosure may be configured to, and without limitation, display any type of information, such as map related information, navigation instructions, certain type of warning or alerts, automatic driving assistance information, vehicle's speed, fuel level, engine temperature, communication events, and other related information on the windshield 50 of the vehicle 10. The display of such information on the windshield 50 of the vehicle 10 may also be represented without limitation in any form, such as digital gauges, text boxes, animated images, or any other graphical representation. Further, the display system 300 of the vehicle 10 may also present augmented reality graphic elements which augment a physical environment surrounding the vehicle 10 with real-time information.

The display panel 20 may include various elements, such as an electroluminescent panel, an incandescent or a phosphorescent light source, a cathode ray tube (CRT), light emitting diodes (LEDs), lenses, collimators, reflectors, and/or polarizers. In some embodiments, the display panel 20 may include an organic light emitting diode (OLED) display panel. In some other embodiments, the display panel 20 may include a liquid crystal display (LCD) panel. The virtual image 12 can be substantially monochromatic, polychromatic, narrow band, or broad band, but preferably overlaps at least a portion of the visible spectrum. Furthermore, the display panel 20 may also include a mechanism, such as a tilting mirror or displacement means, to change the angle and/or position of the virtual image 12 so as to accommodate the passenger 11 at different positions or heights.

Figure 7:
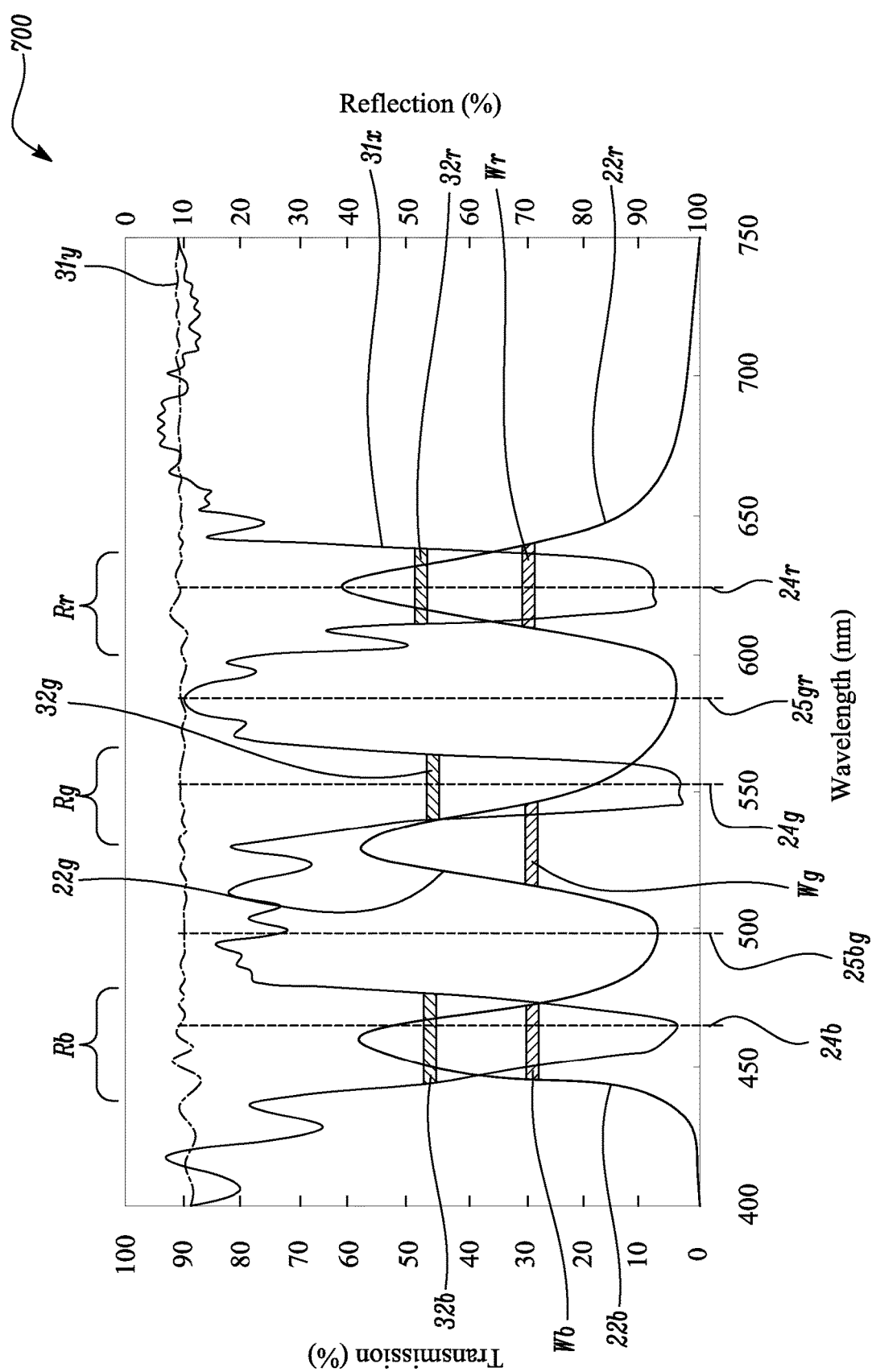
FIG. 7 is a graph illustrating transmission versus wavelength for a reflective polarizer according to an embodiment of the present disclosure.

Referring to FIGS. 1, 2 and 7, the display panel 20 is configured to emit a polarized image light 21 having a first polarization state and substantially distinct blue, green, and red emission spectra 22b, 22g, 22r having respective blue, green and red FWHMs Wb, Wg, Wr.

The reflective polarizer 30 is configured to receive and reflect the polarized image light 21 as a first reflected polarized image light 22. The reflective polarizer 30 may be a notched reflective polarizer having multiple notches or bands. The reflective polarizer 30 has a reflection spectrum 31x for the first polarization state. The reflection spectrum 31x has substantially distinct blue, green and red reflection bands Rb, Rg, Rr with respective blue, green and red FWHMs 32b, 32g, 32r. The reflective polarizer 30 has a reflection spectrum 31y for a second polarization state orthogonal to the first polarization state. In some embodiments, the first polarization state is a P polarization state, while the second polarization state is a S polarization state. In some other embodiments, the first polarization state is a S polarization state, while the second polarization state is a P polarization state.

The first reflected polarized image light 22 is configured to be reflected toward the passenger 11 after reflection from at least the windshield 50 of the vehicle 10. In some embodiments, the windshield 50 is configured to receive and reflect between 5% to 40% of a second reflected polarized image 23 as a third reflected polarized image 27 toward the passenger 11 of the vehicle 10. In the illustrated embodiment of FIG. 2, the mirror 40 is configured to receive and reflect the first reflected polarized image light 22 as the second reflected polarized image 23 toward the windshield 50 of the vehicle 10.

Figure 3:
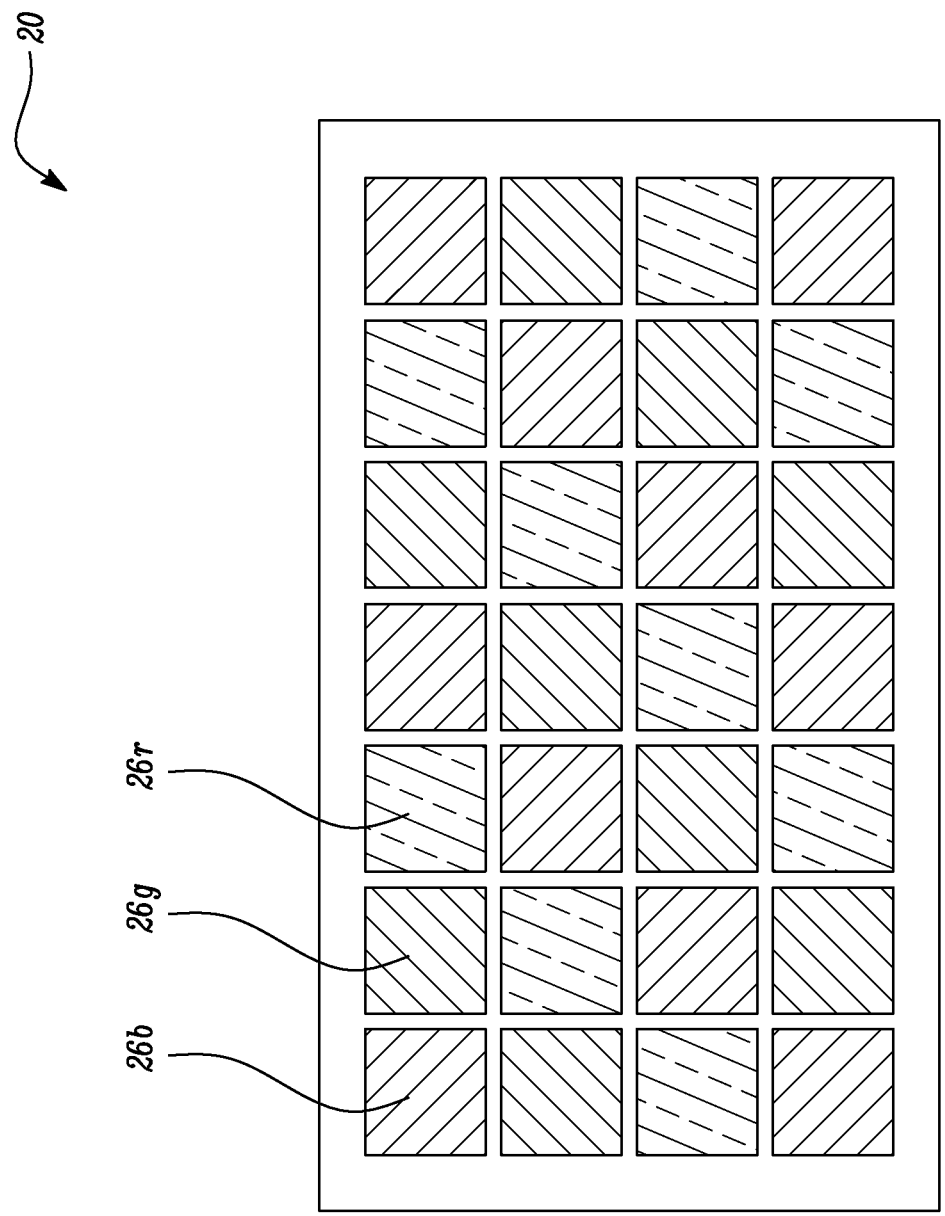
FIG. 3 is a schematic view of a display panel of the display system of FIG. 2.

FIG. 3 illustrates a schematic view of the display panel 20 of the display system 300 shown in FIG. 2. The display panel 20 includes a plurality of blue, green, and red pixels 26b, 26g, 26r. The plurality of blue, green, and red pixels 26b, 26g, 26r are configured to emit the polarized image light 21 having the first polarization state. Lights emitted by the plurality of blue, green, and red pixels 26b, 26g, 26r have the respective blue, green and red emission spectra 22b, 22g, 22r (shown in FIG. 7).

Figure 4:
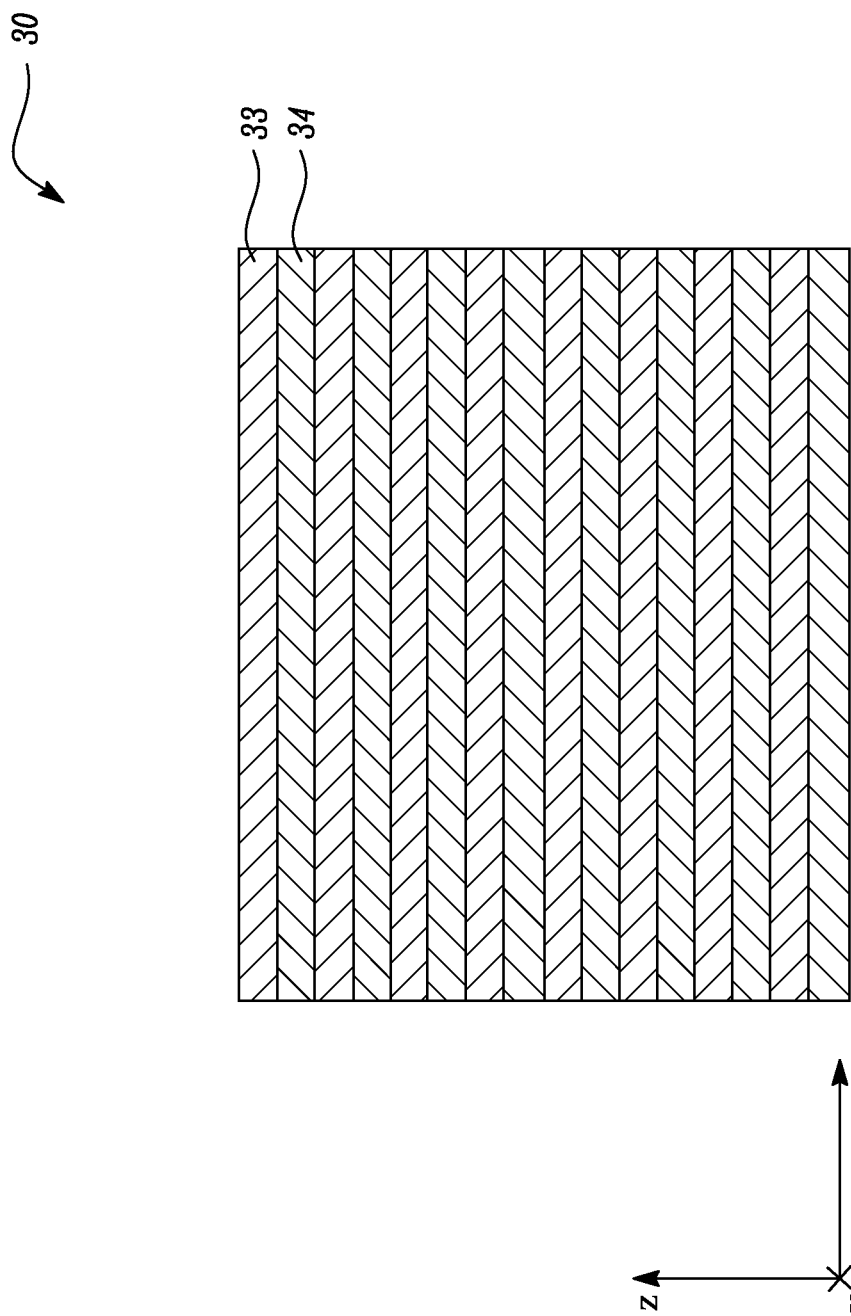
FIG. 4 is a detailed schematic view of a reflective polarizer of the display system according to an embodiment of the present disclosure.

FIG. 4 illustrates a detailed schematic view of the reflective polarizer 30 according to an embodiment of the present disclosure. The reflective polarizer 30 defines mutually orthogonal x, y, and z-axes. The x and y-axes are in-plane axes of the reflective polarizer 30, while the z-axis is a transverse axis disposed along a thickness of the reflective polarizer 30. In other words, the x and y-axes are disposed along a plane of the reflective polarizer 30, while the z-axis is perpendicular to the plane of the reflective polarizer 30. The first polarization state is defined along the x-axis, while the second polarization state is defined along the y-axis.

As shown in FIG. 4, the reflective polarizer 30 includes a plurality of alternating first and second polymeric layers 33, 34. In some embodiments, the plurality of alternating first and second polymeric layers 33, 34 number at least 40 in total. In some other embodiments, the plurality of alternating first and second polymeric layers 33, 34 number at least 50 in total.

In some embodiments, each of the alternating first and second polymeric layers 33, 34 has an average thickness of less than about 350 nm. In some other embodiments, each of the alternating first and second polymeric layers 33, 34 has an average thickness of less than about 400 nm, or less than about 500 nm.

Figure 5B:
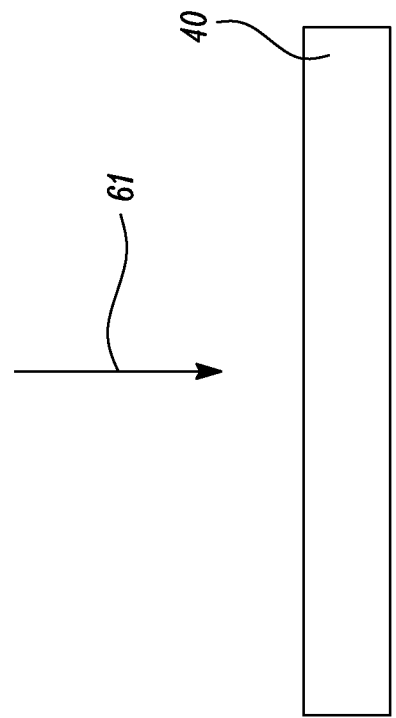
FIG. 5B is a schematic view of a mirror of the display system according to an embodiment of the present disclosure.
Figure 5A:
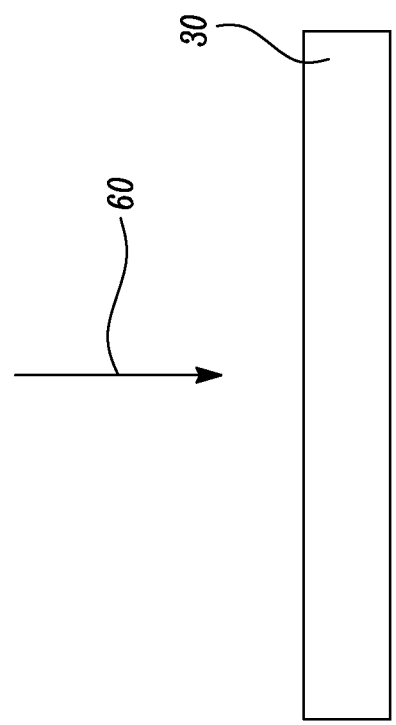
FIG. 5A is a schematic view of a reflective polarizer of the display system according to an embodiment of the present disclosure.

FIG. 5A illustrates a schematic view of the reflective polarizer 30 according to an embodiment of the present disclosure. In some embodiments, the reflective polarizer 30 is curved. Referring to FIGS. 2, 5A and 7, for substantially normally incident light 60, for the first polarization state, the reflective polarizer 30 reflects at least about 60% of the incident light 60 for at least one wavelength 24b, 24g, 24r within each of the FWHMs 32b, 32g, 32r of the blue, green and red reflection bands Rb, Rg, Rr. The wavelengths 24b, 24g, 24r are within the FWHMs 32b, 32g, 32r of the blue, green and red reflection bands Rb, Rg, Rr, respectively. Therefore, the reflective polarizer 30 reflects at least 60% of the incident light 60 for the at least one wavelength 24b within the blue FWHM 32b of the blue reflection band Rb. The reflective polarizer 30 further reflects at least 60% of the incident light 60 for the at least one wavelength 24g within the green FWHM 32g of the green reflection band Rg. The reflective polarizer 30 further reflects at least 60% of the incident light 60 for the at least one wavelength 24r within the red FWHM 32r of the red reflection band Rr. In some embodiments, the reflective polarizer 30 reflects at least about 70%, at least about 75%, at least about 80%, or at least about 85%, of the incident light 60 for the at least one wavelength 24b, 24g, 24r within each of the FWHMs 32b, 32g, 32r of the blue, green and red reflection bands Rb, Rg, Rr.

In some embodiments, for substantially normally incident light 60, the reflective polarizer 30 has an average total reflectance of greater than about 60% for the first polarization state across each of the blue and red FWHMs 32b, 32r, and an average total reflectance of less than about 30% for the first polarization state across the green FWHM 32g.

In some embodiments, for substantially normally incident light 60, for the first polarization state, the reflective polarizer 30 transmits at least about 50% of the incident light 60 for at least one same first wavelength 25bg between the FWHMs 32b, 32g of the blue and green reflection bands Rb, Rg and between the FWHMs Wb, Wg of the blue and green emission spectra 22b, 22g, and for at least one same second wavelength 25gr between the FWHMs 32g, 32r of the green and red reflection bands Rg, Rr and between the FWHMs Wg, Wr of the green and red emission spectra 22g, 22r. The first wavelength 25bg is between the FWHMs 32b, 32g of the blue and green reflection bands Rb, Rg and also between the FWHMs Wb, Wg of the blue and green emission spectra 22b, 22g. The second wavelength 25gr is between the FWHMs 32g, 32r of the green and red reflection bands Rg, Rr and also between the FWHMs Wg, Wr of the green and red emission spectra 22g, 22r. In some embodiments, the reflective polarizer 30 transmits at least about 55%, at least about 60%, or at least about 65% of the incident light 60 for the at least one same first wavelength 25bg between the FWHMs 32b, 32g of the blue and green reflection bands Rb, Rg and between the FWHMs Wb, Wg of the blue and green emission spectra 22b, 22g, and for the at least one same second wavelength 25gr between the FWHMs 32g, 32r of the green and red reflection bands Rg, Rr and between the FWHMs Wg, Wr of the green and red emission spectra 22g, 22r.

In some embodiments, for substantially normally incident light 60, the reflective polarizer 30 has a transmittance of at least about 50% for the first polarization state for at least the first wavelength 25bg between the FWHMs Wb, Wg of the blue and green emission spectra 22b, 22g, and for at least the second wavelength 25gr between the FWHMs Wg, Wr of the green and red emission spectra 22g, 22r. In some embodiments, for substantially normally incident light 60, the reflective polarizer 30 has a transmittance of at least about 55%, at least about 60%, or at least about 65% for the first polarization state for at least the first wavelength 25bg between the FWHMs Wb, Wg of the blue and green emission spectra 22b, 22g, and for at least the second wavelength 25gr between the FWHMs Wg, Wr of the green and red emission spectra 22g, 22r.

For the second polarization state, the reflective polarizer 30 transmits at least about 60% of the incident light 60 for each wavelength in the FWHMs 32b, 32r, Wb, Wr of the blue and red reflection bands Rb, Rr and emission spectra 22b, 22r and each wavelength therebetween. In other words, the reflective polarizer 30 transmits at least about 60% of the incident light 60 for each wavelength in the FWHMs 32b, 32r of the blue and red reflection bands Rb, Rr, respectively, and also for each wavelength between the FWHMs 32b, 32r. The reflective polarizer 30 further transmits at least about 60% of the incident light 60 for each wavelength in the FWHMs Wb, Wr of the emission spectra 22b, 22r, respectively, and also for each wavelength between the FWHMs Wb, Wr. In some embodiments, for the second polarization state, the reflective polarizer 30 may transmit at least about 60% of the incident light 60 for each wavelength in a visible wavelength range from about 400 nanometers (nm) to about 700 nm.

In some embodiments, for the second polarization state, the reflective polarizer 30 transmits at least about 70%, at least about 80%, or at least about 85% of the incident light 60 for each wavelength in the FWHMs 32b, 32r, Wb, Wr of the blue and red reflection bands Rb, Rr and emission spectra 22b, 22r and each wavelength therebetween.

In some embodiments, for substantially normally incident light 60, for the second polarization state, the reflective polarizer 30 has an average total transmittance of greater than about 70% across the visible wavelength range including the blue, green and red FWHMs 32b, 32g, 32r.

The reflective polarizer 30 may substantially reflect incident light (e.g., at least 60% of incident light) for the first polarization state and for wavelengths within each of the FWHMs 32b, 32g, 32r of the blue, green and red reflection bands Rb, Rg, Rr. The reflective polarizer 30 may substantially transmit incident light (e.g., at least 50% of incident light) for the first polarization state and for wavelengths between the FWHMs 32b, 32g of the blue and green reflection bands Rb, Rg, and also between the FWHMs Wb, Wg of the blue and green emission spectra 22b, 22g. The reflective polarizer 30 may further substantially transmit incident light (e.g., at least 50% of incident light) for the first polarization state and for wavelengths between the FWHMs 32g, 32r of the green and red reflection bands Rg, Rr, and also between the FWHMs Wg, Wr of the green and red emission spectra 22g, 22r. Thus, the reflective polarizer may improve the thermal management of the display panel 20.

In addition, the reflective polarizer 30 may substantially transmit incident light (at least 60% of incident light) for the second polarization state, thereby further improving the thermal management of the display panel 20.

In addition, the reflective polarizer 30 substantially transmits the incident light 60 having the second polarization state, thereby further improving the thermal management of the display panel 20.

FIG. 5B illustrates a schematic view of the mirror 40 according to an embodiment of the present disclosure. In some embodiments, the mirror 40 is curved. Now referring to FIGS. 2, 5B and 7, for substantially normally incident light 61, for at least the first polarization state, the mirror 40 reflects at least about 70% of the incident light 61 for each wavelength in the FWHMs Wb, Wg, Wr of the blue, green and red emission spectra 22b, 22g, 22r. In other words, for at least the first polarization state, the mirror 40 reflects at least about 70% of the incident light 61 for each wavelength in the blue FWHM Wb, the green FWHM Wg, and the red FWHM Wr.

In some embodiments, for substantially normally incident light 61, for at least the first polarization state, the mirror 40 reflects at least about 80%, or at least about 90% of the incident light 61 for each wavelength in the FWHMs Wb, Wg, Wr of the blue, green and red emission spectra 22b, 22g, 22r.

In some embodiments, for each of the first and second polarization states, the mirror 40 reflects at least about 70% of the incident light 61 for each wavelength in the FWHMs 32b, 32r, Wb, Wr of the blue and red reflection bands Rb, Rr and emission spectra 22b, 22r and each wavelength therebetween. In other words, for each of the first and second polarization states, the mirror 40 reflects at least about 70% of the incident light 61 for each wavelength in the FWHMs 32b, 32r of the blue and red reflection bands Rb, Rr, respectively, and also for each wavelength between the FWHMs 32b, 32r. For each of the first and second polarization states, the mirror 40 further reflects at least about 70% of the incident light 61 for each wavelength in the FWHMs Wb, Wr of the emission spectra 22b, 22r, respectively, and also for each wavelength between the FWHMs Wb, Wr.

In some embodiments, for each of the first and second polarization states, the mirror 40 reflects at least about 80%, or at least about 90% of the incident light 61 for each wavelength in the FWHMs 32b, 32r, Wb, Wr of the blue and red reflection bands Rb, Rr and emission spectra 22b, 22r and each wavelength therebetween.

In some embodiments, for each of the first and second polarization states, the mirror 40 may reflect at least about 70% of the incident light 61 for each wavelength in a visible wavelength range from about 400 nm to about 700 nm.

Figure 6B:
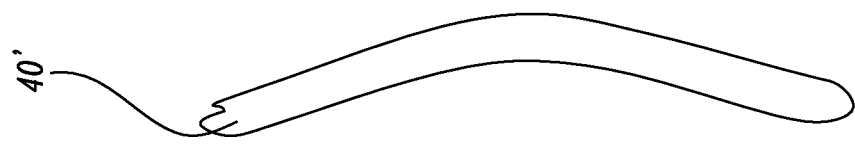
FIG. 6B is a schematic view of a mirror of the display system according to another embodiment of the present disclosure.
Figure 6A:
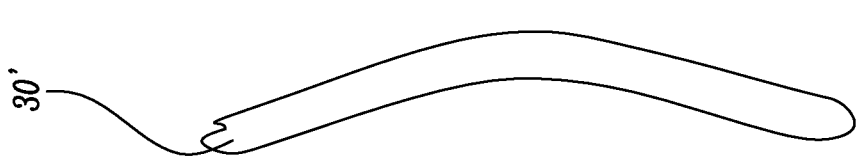
FIG. 6A is a schematic view of a reflective polarizer of the display system according to another embodiment of the present disclosure.

FIG. 6A illustrates a schematic view of a curved reflective polarizer 30'. The curved reflective polarizer 30' may be concave. In some other embodiments, the curved reflective polarizer 30' may be convex.

FIG. 6B illustrates a schematic view of a curved mirror 40'. The curved mirror 40' may be concave. In some other embodiments, the curved mirror 40' may be convex.

In some embodiments, the display system 300 (shown in FIG. 2) includes at least one of the curved reflective polarizer 30' and the curved mirror 40'. In some embodiments, the display system 300 includes the curved reflective polarizer 30'. In another embodiment, the display system 300 includes the curved mirror 40'. In some other examples, the display system 300 includes both the curved reflective polarizer 30' and the curved mirror 40'.

Figure 8:
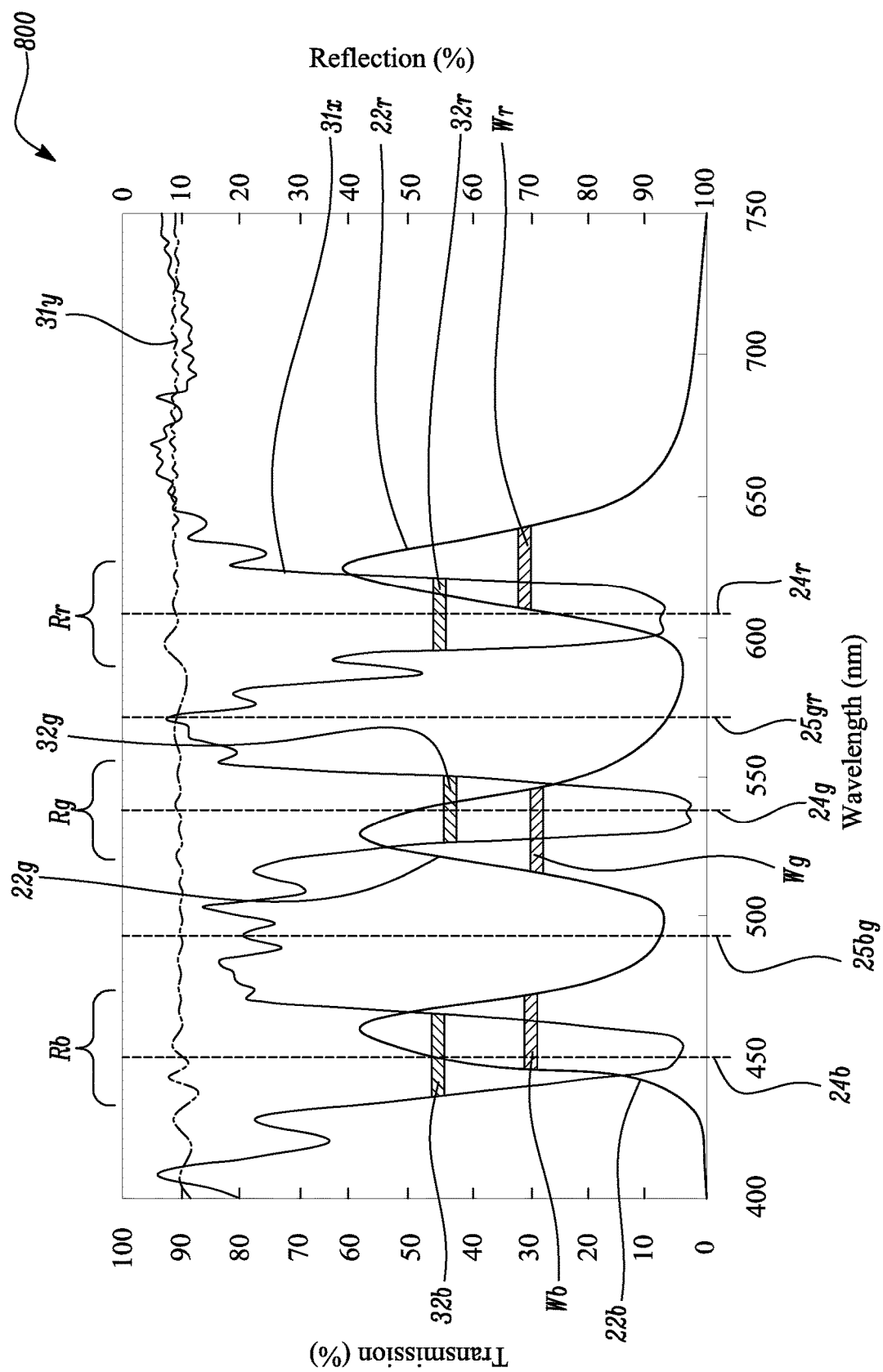
FIG. 8 is a graph illustrating transmission versus wavelength for a reflective polarizer according to another embodiment of the present disclosure.

FIGS. 7 and 8 illustrate graphs 700, 800 depicting a variation of the transmission of the incident light 60 (shown in FIG. 5A) with wavelength for the reflective polarizer 30 (shown in FIG. 2). Wavelength is expressed in nanometers (nm) across the visible wavelength range. The transmittance is expressed as transmission percentage in the left ordinate, while reflectance is expressed as reflection percentage in the right ordinate. The reflection percentage is complementary to the transmission percentage, i.e., reflection percentage= (100−transmission percentage). The graphs 700, 800 illustrate the reflection spectrum 31$x$ of the reflective polarizer 30 for the first polarization state and the reflection spectrum 31$y$ of the reflective polarizer 30 for the second polarization state. The reflection spectrum 31$x$ for the first polarization state includes the blue reflection band Rb, the green reflection band Rg, and the red reflection band Rr with the respective blue FWHM 32$b$, green FWHM 32$g$, and red FWHM 32$r$.

The graphs 700, 800 further illustrate the blue emission spectrum 22$b$, the green emission spectrum 22$g$, and the red emission spectrum 22$r$ having the respective blue FWHM Wb, green FWHM Wg, and red FWHM Wr of the polarized image light 21 emitted by the display panel 20 (shown in FIG. 2). Any suitable energy unit may be used to illustrate the emission spectrum of the display panel 20 in the graphs 700, 800.

The graphs 700, 800 illustrate the wavelength 24$b$ within the blue FWHM 32$b$ of the blue reflection band Rb, the wavelength 24$g$ within the green FWHM 32$g$ of the green reflection band Rg, and the wavelength 24$r$ within the red FWHM 32$r$ of the red reflection band Rr.

The graphs 700, 800 further illustrate the first wavelength 25$bg$ and the second wavelength 25$gr$. The first wavelength 25$bg$ is between the FWHMs 32$b$, 32$g$ of the blue and green reflection bands Rb, Rg and also between the FWHMs Wb, Wg of the blue and green emission spectra 22$b$, 22$g$. The second wavelength 25$gr$ is between the FWHMs 32$g$, 32$r$ of the green and red reflection bands Rg, Rr and also between the FWHMs Wg, Wr of the green and red emission spectra 22$g$, 22$r$.

In some embodiments, at least about 40% of the FWHMs Wb, Wr of the blue and red emission spectra 22$b$, 22$r$ overlap the respective blue and red FWHMs 32$b$, 32$r$ of the reflective bands Rb, Rr. In some embodiments, at least about 50%, at least about 60%, at least about 70%, at least about 80%, or at least about 90% of the FWHMs Wb, Wr of the blue and red emission spectra 22$b$, 22$r$ overlap the respective blue and red FWHMs 32$b$, 32$r$ of the reflective bands Rb, Rr.

As shown in the graph 700, at least about 80% of the FWHMs Wb, Wr of the blue and red emission spectra 22$b$, 22$r$ overlap the respective blue and red FWHMs 32$b$, 32$r$ of the reflective bands Rb, Rr. Further, in some embodiments, at most about 20% of the FWHM Wg of the green emission spectrum 22$g$ overlaps the green FWHM 32$g$ of the green reflective band Rg. In some other embodiments, at most about 10% of the FWHM Wg of the green emission spectrum 22$g$ overlaps the green FWHM 32$g$ of the green reflective band Rg.

As shown in FIG. 7, the blue and red reflective bands Rb, Rr of the reflective polarizer 30 may be substantially aligned with the blue and red emission spectra 22$b$, 22$g$, respectively, of the display panel 20 of the display system 300 (shown in FIG. 2). However, the green reflective band Rg may not be aligned with the green emission spectrum 22$g$. This may further reduce reflection of the incident light 60 for wavelengths in the green emission spectrum 22$g$ toward the display panel 20. This may further improve the thermal management of the display panel 20.

Referring to FIG. 8, at least about 40% of the FWHMs Wb, Wr of the blue and red emission spectra 22$b$, 22$g$ overlap the respective blue and red FWHMs 32$b$, 32$g$ of the reflective bands Rb, Rg.

In the illustrated embodiment of FIG. 8, an increased overlap is present between the FWHM Wg of the green emission spectrum 22$g$ and the green FWHM 32$g$ of the reflective band Rg, as compared to the graph 700 of FIG. 7. In some embodiments, at least about 40% of the FWHM Wg of the green emission spectrum 22$g$ overlaps the green FWHM 32$g$ of the green reflective band Rg. In some other embodiments, at least about 50%, at least about 70%, or at least about 80% of the FWHM Wg of the green emission spectrum 22$g$ overlaps the green FWHM 32$g$ of the green reflective band Rg. Further, a decreased overlap is present between the FWHM Wr of the red emission spectrum 22$r$ and the red FWHM 32$r$ of the reflective band Rr, as compared to the graph 700 of FIG. 7.

Further, as shown in FIG. 8, the blue, green and red reflective bands Rb, Rg, Rr of the reflective polarizer 30 are aligned in varying degrees with the blue, green and red emission spectra 22$b$, 22$g$, 22$r$, respectively, of the display panel 20 of the display system 300 (shown in FIG. 2).

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A display system for displaying a virtual image to a passenger of a vehicle, the display system comprising:
    a display panel configured to emit a polarized image light having a first polarization state and substantially distinct blue, green, and red emission spectra having respective blue, green, and red full widths at half maxima (FWHMs);
    a reflective polarizer configured to receive and reflect the polarized image light as a first reflected polarized image light, the reflective polarizer comprising a reflection spectrum comprising substantially distinct blue, green, and red reflection bands with respective blue, green, and red FWHMs; and
    a mirror configured to receive and reflect the first reflected polarized image light as a second reflected polarized image light toward a windshield of the vehicle, such that for substantially normally incident light:
        for the first polarization state, the reflective polarizer reflects at least about 60% of the incident light for at least one wavelength within each of the FWHMs of the blue, green and red reflection bands;

for the first polarization state, the reflective polarizer transmits at least about 50% of the incident light for at least one same first wavelength between the FWHMs of the blue and green reflection bands and between the FWHMs of the blue and green emission spectra, and for at least one same second wavelength between the FWHMs of the green and red reflection bands and between the FWHMs of the green and red emission spectra;

for an orthogonal second polarization state, the reflective polarizer transmits at least about 60% of the incident light for each wavelength in the FWHMs of the blue and red reflection bands and emission spectra and each wavelength therebetween; and for at least the first polarization state, the mirror reflects at least about 70% of the incident light for each wavelength in the FWHMs of the blue, green and red emission spectra.

2. The display system of claim 1, wherein the display panel comprises a plurality of blue, green and red pixels configured to emit the polarized image light having the first polarization state, and wherein lights emitted by the blue, green and red pixels have the respective blue, green and red emission spectra.

3. The display system of claim 1, wherein at least about 40% of the FWHMs of the blue and red emission spectra overlap the respective blue and red FWHMs of the reflective bands.

4. The display system of claim 1, wherein at least about 40% of the FWHM of the green emission spectrum overlaps the green FWHM of the reflective band.

5. The display system of claim 1, wherein at most about 20% of the FWHM of the green emission spectrum overlaps the green FWHM of the green reflective band.

6. The display system of claim 1, wherein the display panel comprises an organic light emitting diode (OLED) display panel.

7. The display system of claim 1, wherein the windshield is configured to receive and reflect between 5% to 40% of the second reflected polarized image light as a third reflected polarized image light toward the passenger of the vehicle.

8. The display system of claim 1, wherein for each of the first and second polarization states, the mirror reflects at least about 70% of the incident light for each wavelength in the FWHMs of the blue and red reflection bands and emission spectra and each wavelength therebetween.

9. The display system of claim 1, wherein the reflective polarizer comprises a plurality of alternating first and second polymeric layers numbering at least 40 in total, each of the first and second polymeric layers having an average thickness of less than about 350 nm.

10. A display system for displaying a virtual image to a passenger of a vehicle, the display system comprising:

a display panel configured to emit polarized image light having a first polarization state and substantially distinct blue, green, and red emission spectra having respective blue, green and red full widths at half maxima (FWHMs); and a reflective polarizer configured to receive and reflect the polarized image light as a first reflected polarized image light, the first reflected polarized image light configured to be reflected toward the viewer after reflection from at least a windshield of the vehicle, such that for substantially normally incident light, the reflective polarizer has:

an average total reflectance of greater than about 60% for the first polarization state across each of the blue and red FWHMs, and an average total reflectance of less than about 30% for the first polarization state across the green FWHM;

a transmittance of at least about 50% for the first polarization state for at least a first wavelength between the FWHMs of the blue and green emission spectra, and for at least a second wavelength between the FWHMs of the green and red emission spectra; and an average total transmittance of greater than about 70% across a visible wavelength range comprising at least each of the blue, green and red FWHMs for an orthogonal second polarization state.

\* \* \* \* \*